(12) United States Patent
Dunmire

(10) Patent No.: US 9,333,896 B2
(45) Date of Patent: May 10, 2016

(54) HOOK ASSEMBLY FOR CHAIN TENSIONERS

(71) Applicant: Davis Aircraft Products Co., Inc., Bohemia, NY (US)

(72) Inventor: Daniel F. Dunmire, Stony Brook, NY (US)

(73) Assignee: Davis Aircraft Product Co., Inc., Bohemia, NY (US)

( * ) Notice: Subject to any disclaimer, the term of this patent is extended or adjusted under 35 U.S.C. 154(b) by 0 days.

(21) Appl. No.: 14/497,014

(22) Filed: Sep. 25, 2014

(65) Prior Publication Data

US 2016/0090021 A1 Mar. 31, 2016

(51) Int. Cl.
*B60P 7/06* (2006.01)
*B60P 7/08* (2006.01)

(52) U.S. Cl.
CPC .................... *B60P 7/0823* (2013.01)

(58) Field of Classification Search
CPC ............ B60P 7/06; B60P 7/08; B60P 7/0823; B60P 7/0838
USPC ........................................... 410/96, 101, 103
See application file for complete search history.

(56) References Cited

U.S. PATENT DOCUMENTS

| | | | |
|---|---|---|---|
| 1,247,760 A * | 11/1917 | Wengraf | 267/74 |
| 1,404,117 A | 1/1922 | Hanson | |
| 1,605,187 A | 11/1926 | Holt | |
| 1,657,260 A | 1/1928 | Holt | |
| 1,733,508 A | 10/1929 | Minor | |
| 1,806,908 A * | 5/1931 | Long | 294/82.16 |
| 1,922,386 A * | 8/1933 | Minor | 294/82.1 |
| 3,142,877 A * | 8/1964 | Lesley | 24/68 CD |
| 3,366,997 A * | 2/1968 | Lesley | 24/68 R |
| 3,462,137 A * | 8/1969 | Grube | 410/41 |
| 3,670,795 A * | 6/1972 | Kupfrian | 411/195 |
| 3,718,946 A * | 3/1973 | Lunsford et al. | 410/103 |
| 4,335,489 A * | 6/1982 | Muller et al. | 24/68 CT |
| 4,606,096 A * | 8/1986 | Wood et al. | 24/68 CT |
| 4,850,768 A | 7/1989 | Huber | |
| 5,542,798 A * | 8/1996 | Rawdon et al. | 410/100 |
| 8,646,820 B2 | 2/2014 | Knox et al. | |
| 8,702,360 B1 * | 4/2014 | Smith | 410/116 |

* cited by examiner

*Primary Examiner* — H Gutman
(74) *Attorney, Agent, or Firm* — Law Offices of Michael L. Wise, LLC

(57) ABSTRACT

Aspects of the invention are directed to an apparatus that may be used as a chain tensioner. The apparatus comprises an attachment element, such as a hook, that is rotatably coupled to a locking plate. In use, the apparatus is operative to take on a plurality of locked states and an unlocked state. Each of the plurality of locked states is characterized by the locking plate being pressed into a cavity of a locking body in a manner that prevents the locking body, and, by extension, the attachment element from rotating. The unlocked state is characterized by the locking plate being outside the cavity, and thereby free to rotate. The attachment element is therefore capable of being swiveled between, and locked into, multiple orientations.

18 Claims, 14 Drawing Sheets

HOOK ASSEMBLY FOR CHAIN TENSIONERS

FIELD OF THE INVENTION

The present invention relates generally to load-engaging elements, and, more particularly, to chain tensioners for use in securing cargo for transport.

BACKGROUND OF THE INVENTION

Chain tensioners (sometimes called "tie down tensioners") are commonly used to secure cargo during transport. A chain tensioner will typically comprise an apparatus with a hook at one end and a means for attaching a chain at the other. The chain may be attached to the cargo, while the hook may be attached to a tie-down ring on an aircraft or other form of transport. After the chain is initially attached between the chain tensioner and the cargo, a tensioning wheel on the chain tensioner may be rotated to effectively reduce the length of the chain tensioner, and thereby increase the tension on the chain. Later, the chain may be quickly released by manipulating a release handle on one side of the chain tensioner. Such chain tensioners are available from, for example, Davis Aircraft Products Co. (Bohemia, N.Y., USA), as well as others.

When utilizing a chain tensioner to restrain cargo, it is generally preferred that the release handle face upward so that the operator can quickly ascertain its state and avoid unintended releases. In November 2011, the U.S. Department of Defense (DOD) reinforced this preference by publishing Detail Specification MIL-DTL-25949H, which is hereby incorporated by reference herein. In this Specification, the DOD requests a new chain tensioner design with the ability to rotate its hook relative to the remainder of the device. More specifically, the requested chain tensioner must have the capability of swiveling and locking the hook into two positions 180-degrees from one another. The Specification further requires that the hook shall be capable of rotating in both the clockwise and counterclockwise directions, and that no tools shall be required to rotate and lock the hook into the new orientations.

For the foregoing reasons, there is a need for new chain tensioner designs that incorporate hook connection assemblies capable of allowing a hook to be swiveled between, and locked into, multiple orientations.

SUMMARY OF THE INVENTION

Embodiments of the present invention address the above-identified needs by providing chain tensioner designs that incorporate an attachment element (e.g., hook) capable of being swiveled between, and locked into, multiple orientations.

Aspects of the invention are directed to an apparatus comprising: a frame, a locking body, a threaded receiver, a locking plate, a biasing element, an attachment element, and a threaded shaft. The locking body is fixed in the frame, and defines a cavity and an aperture therein, the aperture being in communication with the cavity. Moreover, the threaded receiver passes through the aperture, at least partially occupies the cavity, and is free to rotate. The locking plate defines a mating slot and has a shape that prevents the locking plate from rotating within the cavity when the locking plate is inserted into the cavity. The biasing element is in contact with the locking plate. Lastly, the threaded shaft extends in a longitudinal direction from the attachment element through the threaded receiver and the mating slot, and is shaped so as to cooperate with the mating slot to prevent the threaded shaft from rotating independently of the locking plate while still being translatable in the longitudinal direction therethrough. The apparatus is operative to take on a plurality of locked states and an unlocked state, each of the plurality of locked states characterized by the locking plate being pressed into the cavity by the biasing element and thereby prevented from rotating by the locking body, and the unlocked state characterized by the locking plate being outside the cavity and thereby free to rotate. The unlocked state can be achieved from a respective one of the plurality of locked states by manually pressing the threaded receiver against the locking plate so as to translate the locking plate out of the cavity counter to the bias of the biasing element.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein, the term "about," when used to modify a length, shall mean within 15 percent of the recited length. In addition, as used herein, pairs of sidewalls, surfaces, or edges that are "opposed," "parallel," or "oppositely facing" run parallel to each other within ten degrees.

Figure 1:
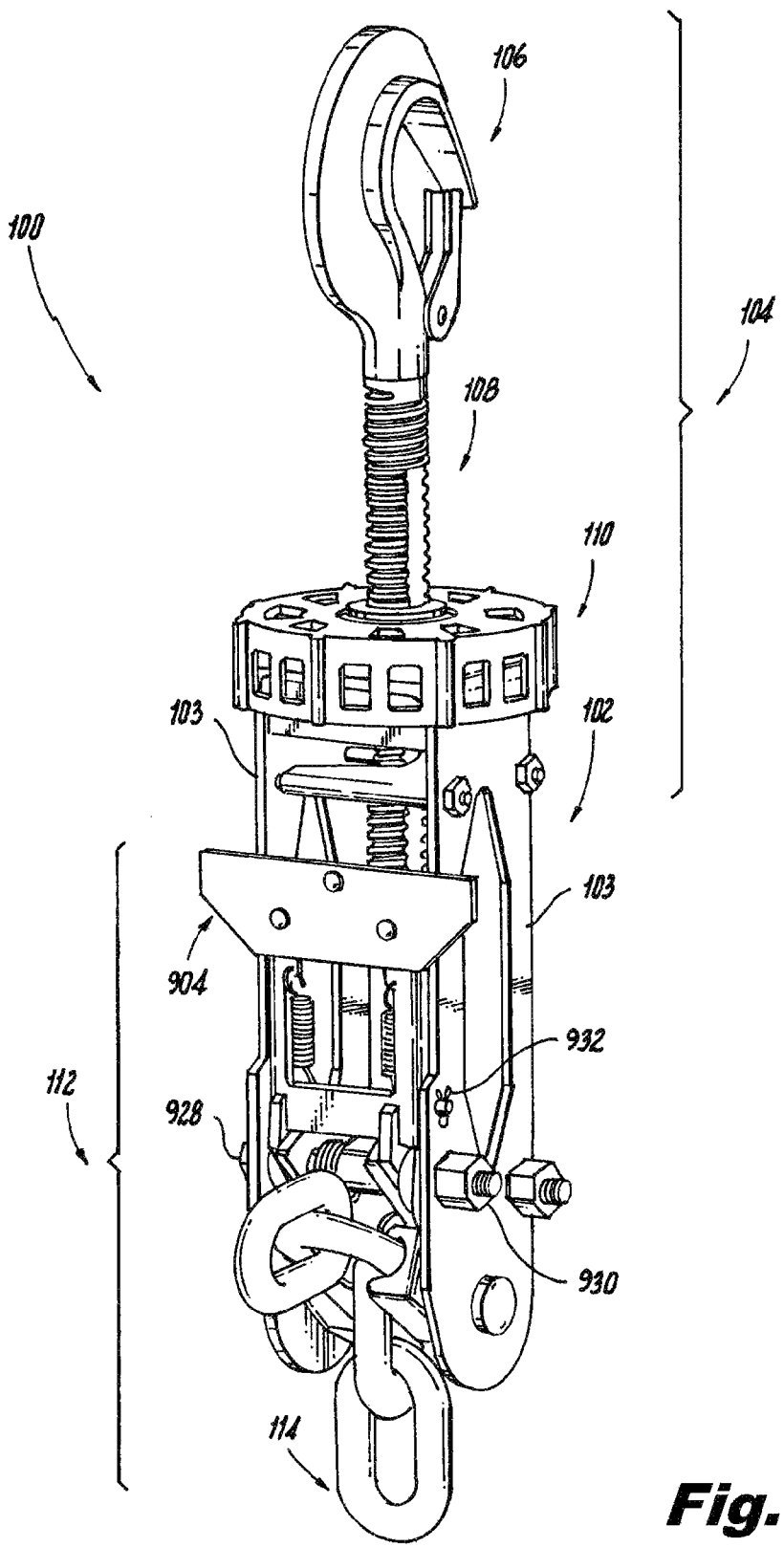
FIGS. 1 and 2 show front and rear perspective views, respectively, of an apparatus 100 in accordance with an illustrative embodiment of the invention.
Figure 2:
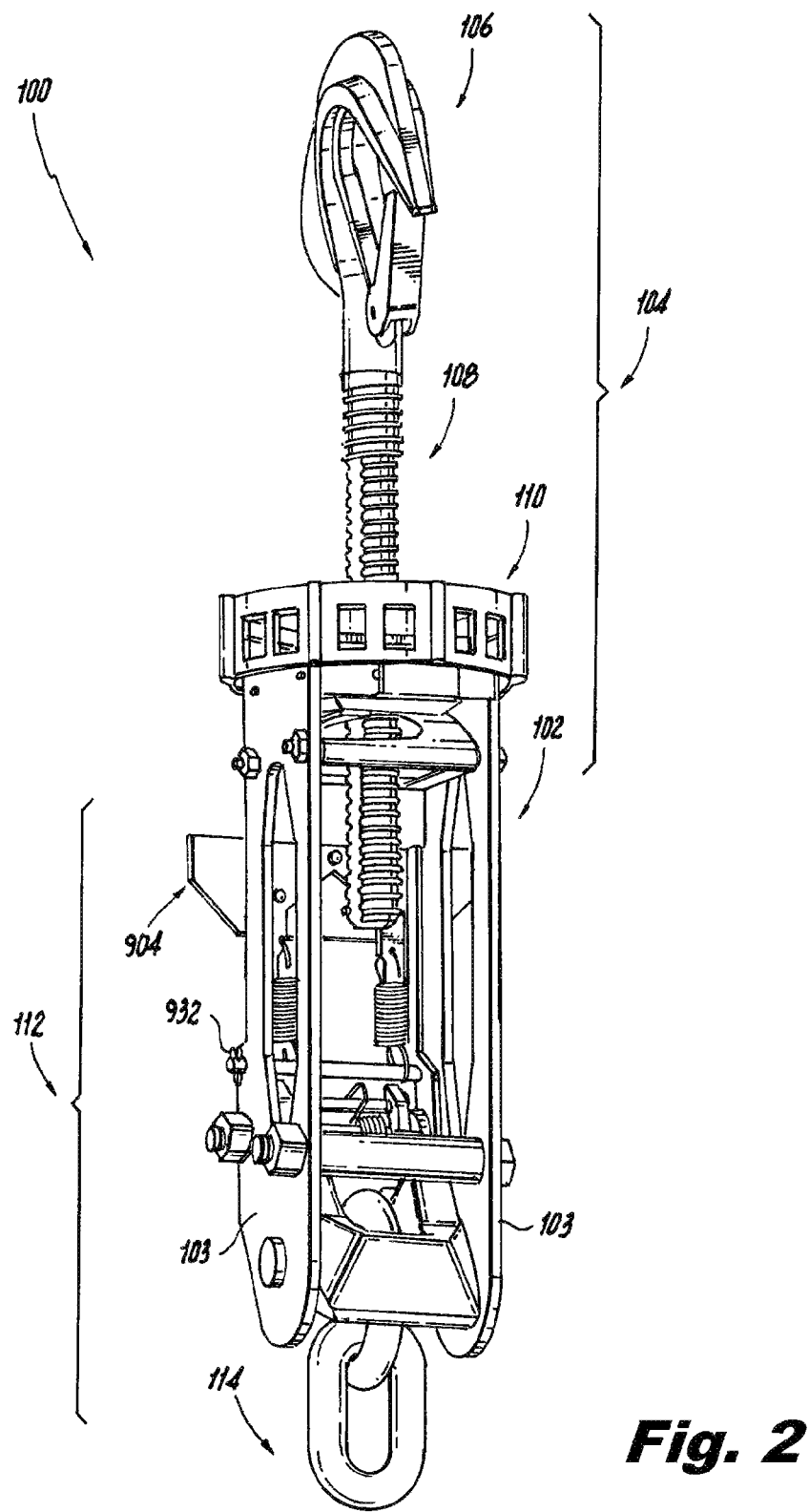

FIGS. 1 and 2 show front and rear perspective views, respectively, of an apparatus 100 in accordance with an illustrative embodiment of the invention. The apparatus may be conceptually separated into two portions, which are mated together by a u-shaped frame 102 defining a pair of parallel sidewalls 103. At the top of the apparatus 100 (as oriented in FIGS. 1 and 2), a hook assembly 104 provides a hook 106 and a threaded shaft 108, which are longitudinally translatable relative to the frame 102 in response to the rotation of a tensioning wheel 110. At the bottom of the apparatus, a chain capture assembly 112 provides a means for releasably attaching a chain 114 to the apparatus 100.

So configured, the apparatus 100 may be utilized as a chain tensioner device to aid in securing cargo for transport in an aircraft or other mode of transport. Cargo that is attached to the chain 114, for example, can be secured for transport by attaching the hook 106 at one end of the apparatus 100 to a tie-down ring, and then attaching the chain 114 to the apparatus 100 at the other end. The apparatus thereby becomes a bridge between the tie-down ring and the chain 114. The tensioning wheel 110 may subsequently be rotated to obtain the desired tension across the chain 106 and the apparatus 100. It is contemplated that embodiments in accordance with aspects of the invention would be capable of applying tensions in excess of 300 pounds. Once the cargo is successfully transported, the chain can be quickly disconnected via a release handle 904.

Each of the hook assembly 104 and the chain capture assembly 112 comprises novel and non-obvious aspects, and each portion is now addressed in detail. Embodiments in accordance with aspects of the invention may comprise elements of both portions, or may only comprise aspects of one of the two portions.

I. Hook Assembly

Figure 3:
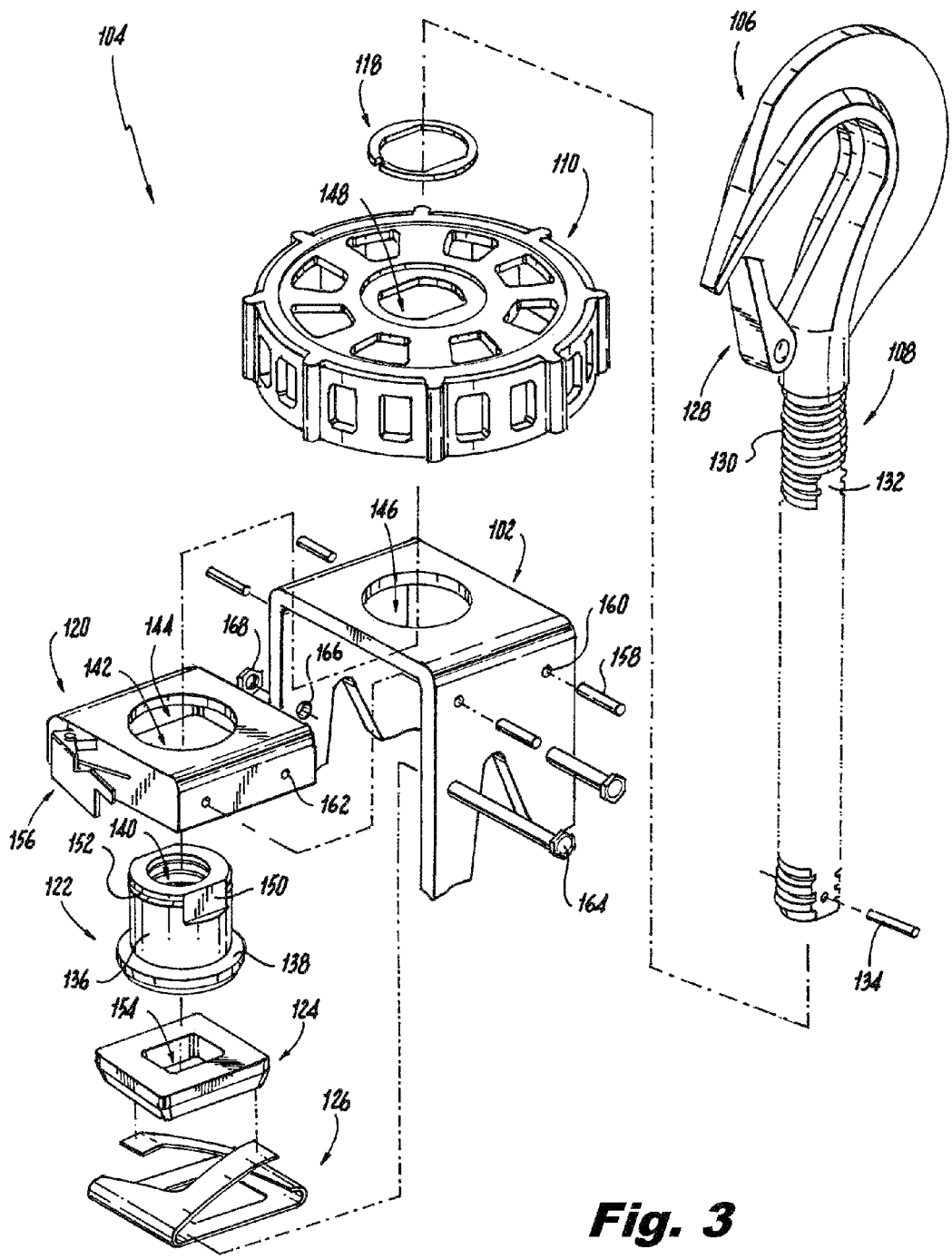
FIG. 3 shows an exploded side perspective view of the hook assembly in the apparatus 100, in accordance with an illustrative embodiment of the invention.

FIG. 3 shows an exploded side perspective view of the hook assembly 104 in the apparatus 100, in accordance with an illustrative embodiment of the invention. In addition to the frame 102, the hook 106, the threaded shaft 108, and the tensioning wheel 110, the hook assembly 104 further comprises: a retaining ring 118, a locking body 120, a threaded receiver 122, a locking plate 124, and a biasing element 126. The hook 106 comprises a spring-loaded keeper 128. The threaded shaft 108, in turn, attaches to the base of the hook 106 and extends in the longitudinal direction therefrom. The threaded shaft 108 defines two different profiles along its length. An upper portion of the threaded shaft proximate to the hook 106 is defined by an externally threaded cylinder 130. Further down the threaded shaft 108, the threaded shaft 108 is defined by the externally threaded cylinder 130 with a pair of oppositely facing flat surfaces 132. Near the bottom of the threaded shaft, a pin 134 passes through the threaded shaft 108 to stop the threaded shaft 108 from being overly extended.

The threaded receiver 122 defines an upper cylindrical portion 136 and a lower protruding lip 138 that surround a threaded passageway 140. At the same time, the locking body 120 defines a cavity 142 and an aperture 144 that is in communication with the cavity 142. When assembled, the lower protruding lip 138 of the threaded receiver 122 occupies the cavity 142, while the upper cylindrical portion 136 passes through the aperture 144. After so doing, the upper cylindrical portion 136 further passes through a lower opening 146 in the frame 102 before ultimately engaging a shaped opening 148 in the tensioning wheel 110. Where the upper cylindrical portion 136 engages the shaped opening 148, the upper cylindrical portion 136 defines a pair of outside flat surfaces 150 that match the shape of the shaped opening 148. Above the tensioning wheel 110, the retaining ring 118 clips onto the upper cylindrical portion at a groove 152. The tensioning wheel 110 and the threaded receiver 122 are thereby both rotationally and translatably coupled to one another. That is, rotating the tensioning wheel 110 causes the threaded receiver 122 to also rotate. Moving the tensioning wheel 110 up and down along the longitudinal axis causes the threaded receiver 122 to also move up and down along the same axis.

The threaded passageway 140 in the threaded receiver 122 threadably engages the threaded shaft 108. After passing through the threaded receiver 122, the threaded shaft 108 further extends through a mating slot 154 in the locking plate 124 and through the biasing element 126. The biasing element 126 presses the locking plate 124 against the threaded receiver 122. In the present illustrative embodiment, the biasing element 126 defines a leaf spring in contact with the locking plate 124, but this particular arrangement is not intended as being limiting. A tensioning wheel locking mechanism 156 is also visible on an outside face of the locking body 120, and is further detailed below.

In the present illustrative embodiment, the locking body 120 is fixated in the frame 102 by four roll pins 158 that pass through frame apertures 160 in the frame 102 and engage complementary holes 162 in the locking body 120. The biasing element 126 is fixated to the frame 102 by two bolts 164 that pass through bolt openings 166 in the frame 102 while simultaneously passing through the biasing element 126. The bolts are secured by nuts. 168

Figure 4:
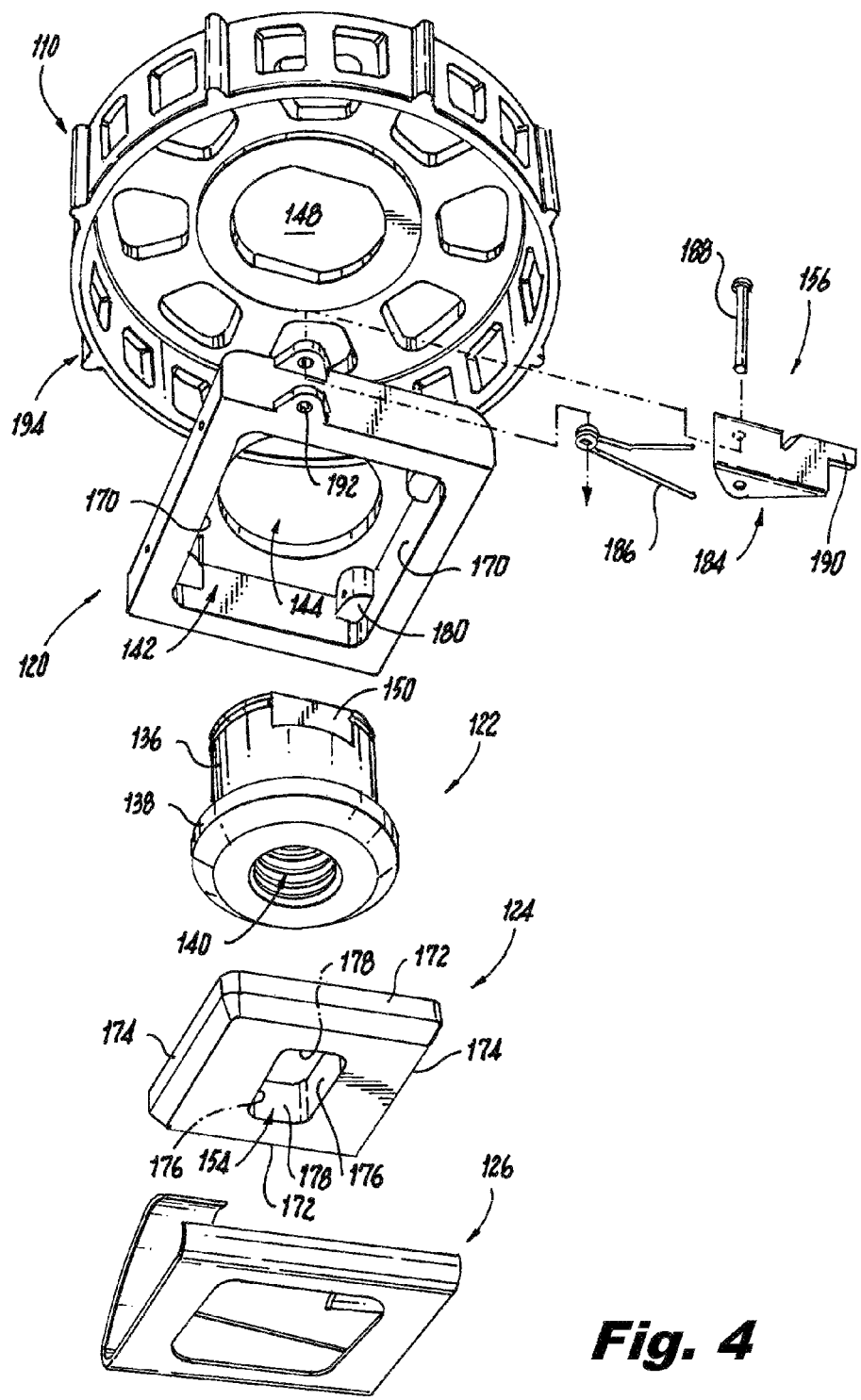
FIG. 4 shows a bottom perspective view of several elements within the FIG. 3 hook assembly.

The tensioning wheel 110, the locking body 120, the threaded receiver 122, the locking plate 124, and the biasing element 126 cooperate to allow the hook 106 to be both translated inward and outward along the longitudinal axis of the apparatus 100, as well as swiveled between, and locked into, multiple orientations relative to the frame 102. FIG. 4 shows an exploded bottom perspective view of these elements so that additional aspects that lend to this functionality may be more easily appreciated.

It will be noted, for example, that the locking body 120 and the locking plate 124 are dimensionally related to one another. In the present illustrative embodiment, the cavity 142 in the locking body 120 is rectangular and defines a pair of parallel internal sidewalls 170 along its narrower, width axis. At the same time, the locking plate 124, which, in this example is square, defines two pairs of parallel outside edges 172, 174. In accordance with aspects of the invention, the pair of parallel internal sidewalls 170 are spaced apart by a distance about equal to the spacing between the two pairs of parallel outside edges 172, 174. It is therefore possible to insert the locking plate 124 into the cavity 142 of the locking body 120 in four different orientations. Once so inserted, the pair of parallel internal sidewalls 170 of the locking body 120 interact with one of the pairs of parallel outside edges 172, 174 of the locking plate 124 to prevent the locking plate 124 from rotating therein. That is, the locking plate 124 has a shape that prevents it from rotating within the cavity 142 when the locking plate 124 is inserted into the cavity 142.

It will be further appreciated, moreover, that the mating slot 154 has dimensions that relate to the shape of the threaded shaft 108. As indicated above, a majority of the threaded shaft 108 defines an externally threaded cylinder 130 with a pair of oppositely facing flat surfaces 132. The mating slot 154, in turn, is characterized by a pair of opposed sidewalls 176, which are spaced apart by a distance about equal to a spacing between the pair of oppositely facing flat surfaces 132. At the same time the mating slot 154 is further characterized by a pair of opposite sidewalls 178 spaced apart by a distance greater than the maximum diameter of the externally threaded cylinder 130. Configured in this manner, the threaded shaft 108 is able to be translated longitudinally through the mating slot 154, but the threaded shaft 108 is not able to rotate inside the mating slot 154 because of interference between the pair of oppositely facing flat surfaces 132 and the pair of opposed sidewalls 176. Stated another way, the threaded shaft 108 is so shaped as to cooperate with the mating slot 154 to prevent the threaded shaft 108 from rotating independently of the locking plate 124 while still being translatable in the longitudinal direction therethrough.

Lastly, it will be noted that the cavity 142 defines several internal shoulders 180 therein. In the present illustrative embodiment, these internal shoulders 180 are located at the four corners of the rectangular cavity 142.

Figure 5:
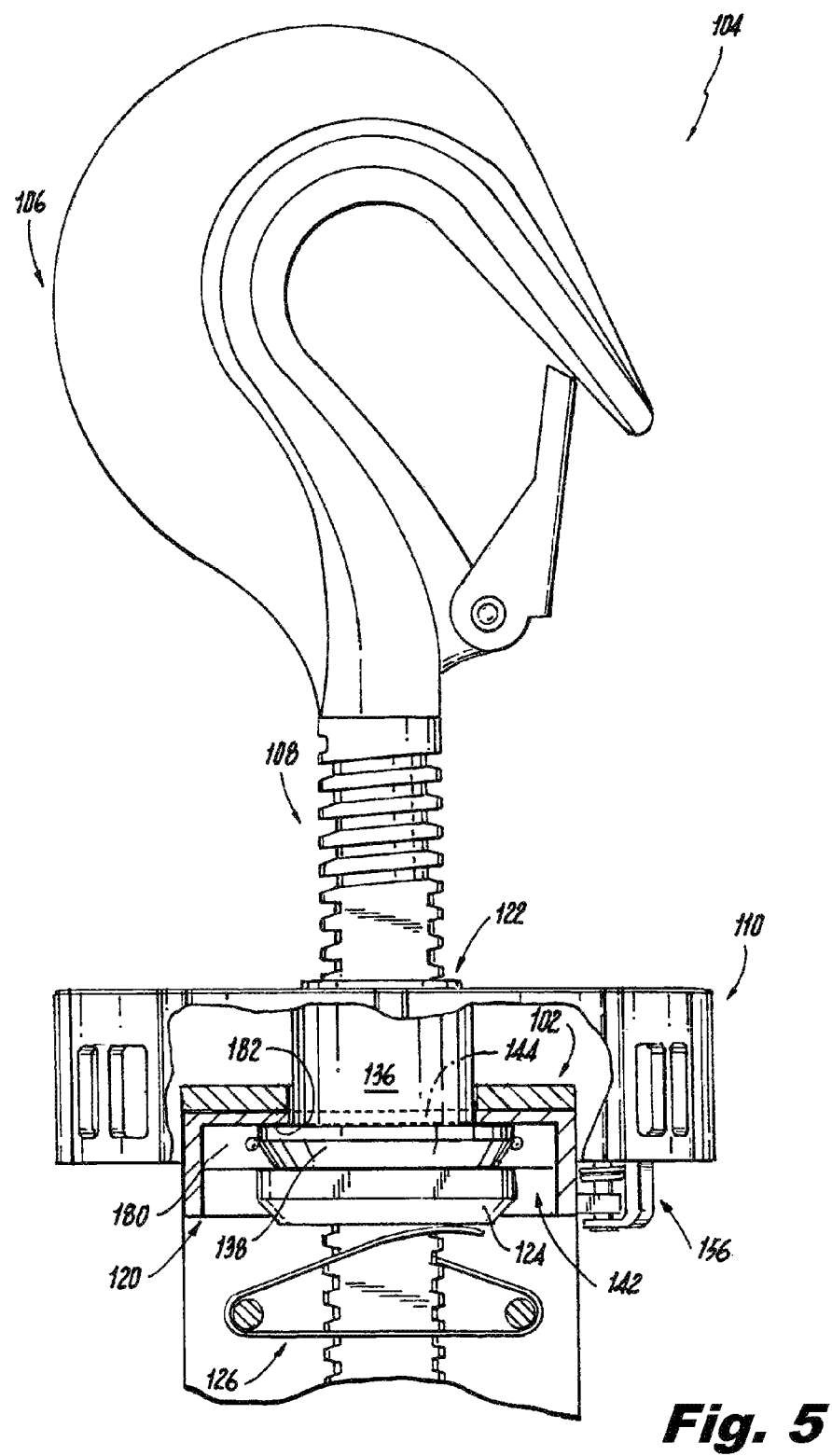
FIGS. 5-7 show partially cutaway elevational views of a portion of the FIG. 3 hook assembly in locked and unlocked states.
Figure 6:
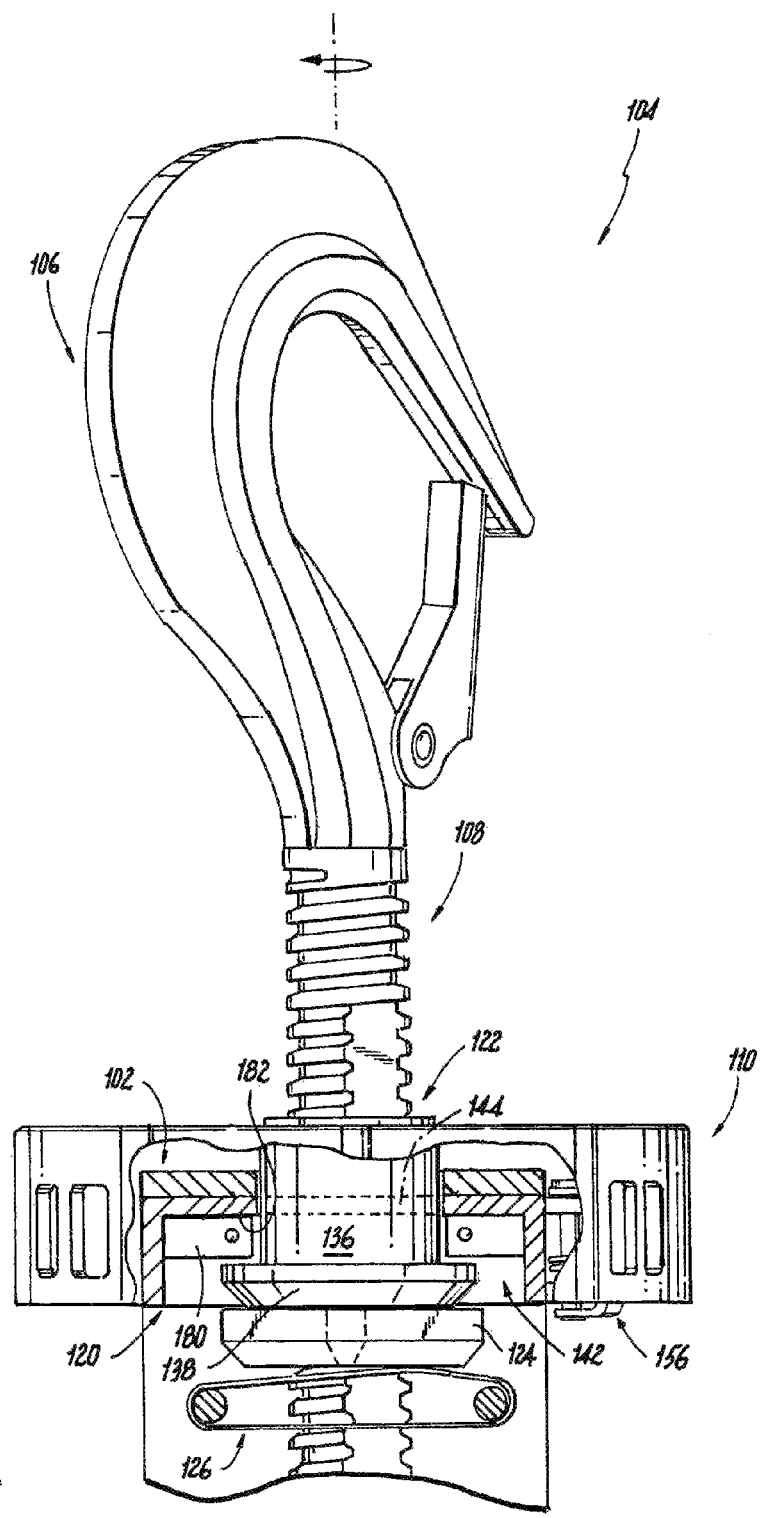
Figure 7:
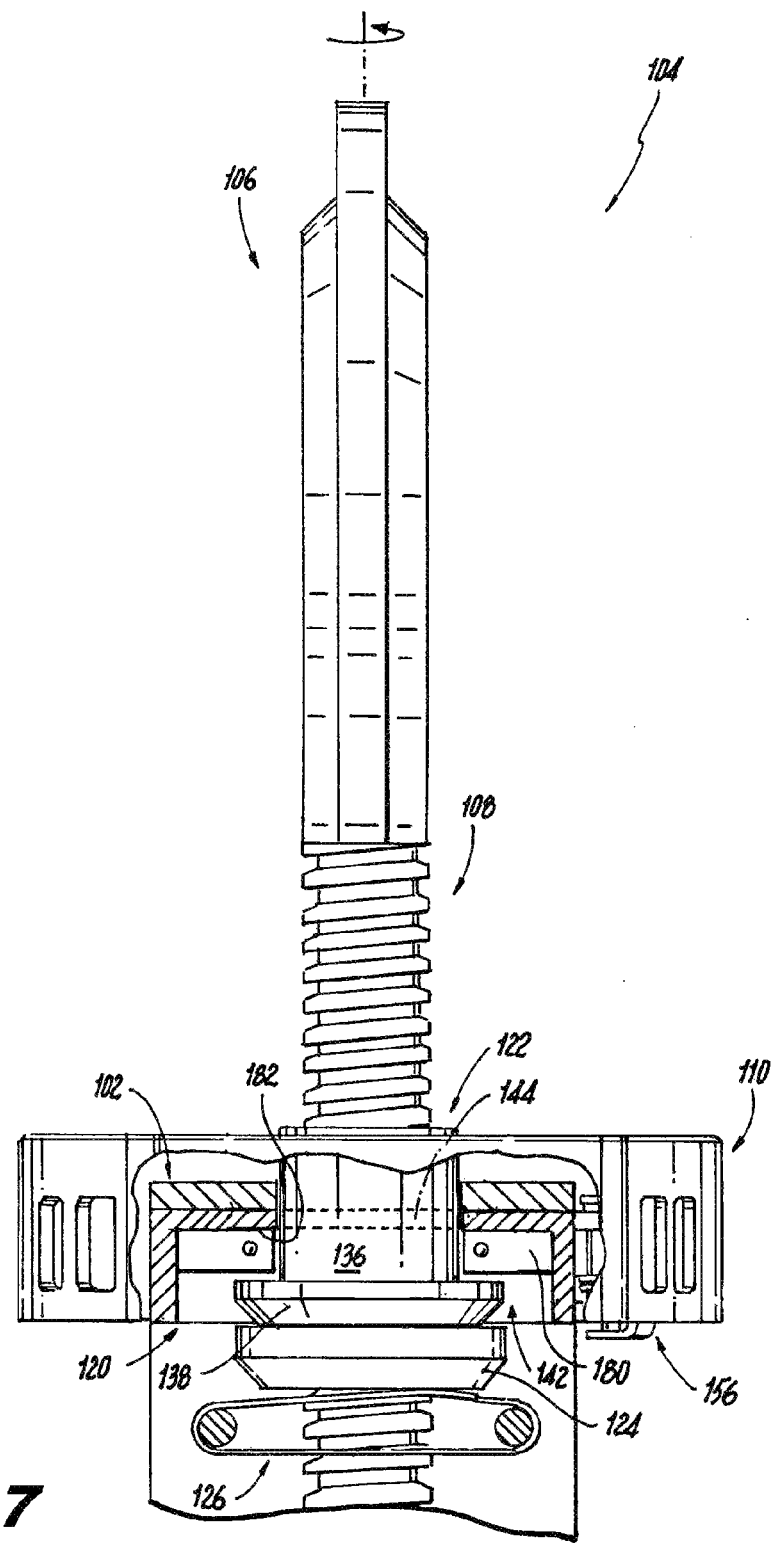

FIGS. 5-7 show partially cutaway elevational views of the hook assembly 104 with the purpose of showing how the elements cooperate to allow the hook orientation to be changed and locked. As will be shown by this sequence of figures, the hook assembly 104 is operative to take on a plurality of locked states and an unlocked state. Each of the plurality of locked states is characterized by the locking plate 124 being pressed into the cavity 142 by the biasing element 126 and thereby prevented from rotating by the locking body 120 in the manner set forth above. With the locking plate 124 unable to rotate, the threaded shaft 108 and the hook 106 are likewise unable to rotate about the longitudinal axis. In contrast, the unlocked state is characterized by the locking plate 124 being outside the cavity 142 and thereby free to rotate, along with the threaded shaft 108 and the hook 106.

The present hook assembly 104 is operative to take on four different locked states, each of which is characterized by a different orientation of the hook 106 relative to the frame 102. FIG. 5 shows the hook assembly 104 in a representative one of these four locked states. In this locked state, the biasing element 126 presses the locking plate 124 against the threaded receiver 122 and the internal shoulders 180, and, in response, the protruding lip 138 of the threaded receiver 122 abuts a perimeter 182 of the aperture 144 inside the cavity 142. The locking plate 124 thereby occupies the cavity 142 of the locking body 120, causing the locking plate 124 to be restricted in rotation. In contrast, the threaded receiver 122 remains free to rotate inside the cavity 142 in response to the rotation of the tensioning wheel 110. Rotating the tensioning wheel 110 and the threaded receiver 122 causes the threaded shaft 108 and the hook 106 to be translated along the longitudinal axis of the apparatus 100. The apparatus 100 thereby retains its "tensioning" functionality while in the locked state. Stated another way, the tensioning wheel 110 may be rotated with the apparatus 100 in the locked state to cause the hook 106 to move in the longitudinal direction relative to the frame 102 while maintaining a fixed orientation relative to the frame 102.

FIG. 6 shows the apparatus 100 in the unlocked state. The unlocked state can be achieved from one of the locked states by manually pressing the threaded receiver 122 against the locking plate 124 so as to translate the locking plate 124 out of the cavity 142 counter to the bias of the biasing element 126. The manual pressing force may be applied to the tensioning wheel 110 because, as discussed above, the tensioning wheel 110 is translatably coupled to the threaded receiver 122. In the unlocked state, the biasing element 126 is compressed and the protruding lip 138 is in spaced relation to the perimeter 182 of the aperture 144, but still partially occupies the cavity 142. With the locking plate 124 outside the locking body 120, the locking plate 124 and, correspondingly, the threaded shaft 108 and the hook 106 may be rotated relative to the frame 102. In FIG. 6, it will be observed that, for example, the hook 106 is rotated by about 45-degrees relative to its orientation in FIG. 5.

Once the hook 106, the threaded shaft 108, and the locking plate 124 have achieved an orientation where the locking plate 124 can be reinserted into the locking body 120 (in the present embodiment, at 0-degrees, 90-degrees, 180-degrees, and 270-degrees), the manual force can be relieved on the tensioning wheel 110 so as to allow the apparatus 100 to return to a locked state in response to the biasing force from the biasing element 126. Such a condition is shown in FIG. 7, which shows the locking plate 124 in an orientation where reinsertion into the cavity 142 of the locking body 120 is allowed, but before the manual downward force has actually been relieved. The hook 106 can thereby be quickly and easily swiveled between, and locked into, multiple orientations relative to the frame 102 without the use of tools. The swiveling may occur in either direction (i.e., clockwise or counterclockwise). In any one of the locked states, moreover, the tensioning function that incorporates the longitudinal translation of the hook 106 relative to the frame 102 remains available to the user through the rotation of the tensioning wheel 110.

Figure 8:
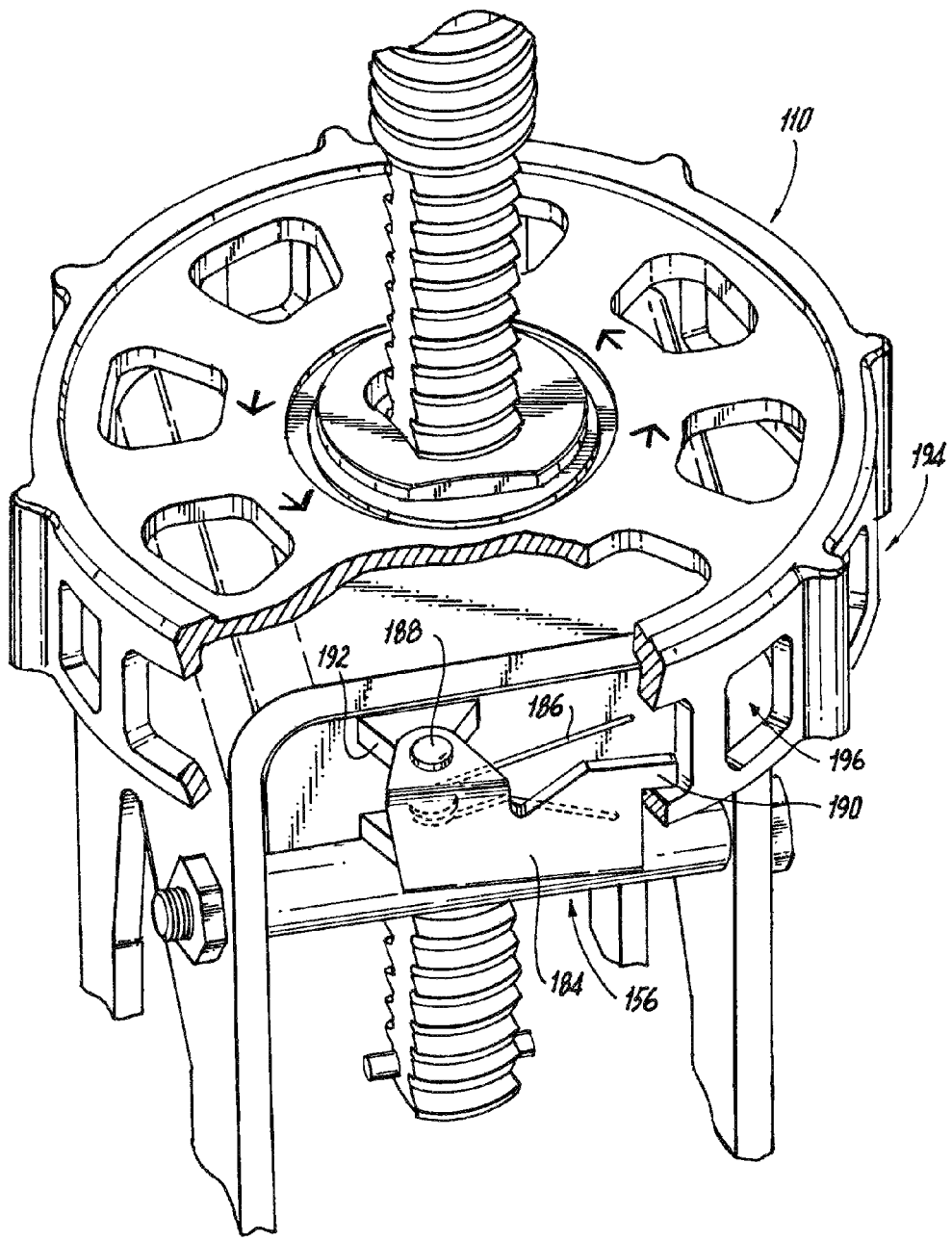
FIG. 8 shows a partially cutaway perspective view of a portion of the FIG. 3 assembly relating to the tension wheel locking mechanism.

An additional feature of the apparatus 100 is the tensioning wheel locking mechanism 156, briefly mentioned above. The main components of the tensioning wheel locking mechanism 156 are best seen in FIG. 4, while the positioning and functioning of the tensioning wheel locking mechanism 156 in the apparatus 100 are best seen in the partially cutaway front perspective view in FIG. 8. The tensioning wheel locking mechanism 156 includes a button 184, a coil spring 186, and a retaining pin 188. The button 184 defines an extension 190 at one end. The retaining pin 188 fixes the tensioning wheel locking mechanism 156 to an outside sidewall of the locking body 120 via two tabs 192 with aligned holes. So placed, the coil spring 186 pushes the extension-end of the button 184 outward away from the locking body 120 towards a cylindrical sidewall 194 of the tensioning wheel 110. The cylindrical sidewall 194 defines a plurality of locking windows 196 arranged along its perimeter.

When the tensioning wheel 110 is turned in a direction that increases tension in the apparatus 100 (in this embodiment, in the counter-clockwise direction), the extension 190 on the button 184 continuously ratchets into and out of the locking windows 196 as they move past. A user may therefore increase tension without attention to the tensioning wheel locking mechanism 156. On the other hand, once a given tension is achieved, the button 184 interferes with the tensioning wheel 110 being turned in the opposite direction. That is, the extension 190 sits within one of the locking windows 196 and will abut against an inside edge of that locking window 196 if the user tries to rotate the tensioning wheel 110 so as to relieve tension (the condition shown in FIG. 8). This locked state may only be defeated by having the user manually press the button 184 in against the force of the coil spring 186 to move the button 184 and its extension 190 out of the way.

The tensioning wheel locking mechanism 156 thereby allows tension to be increased via the tensioning wheel 110 without interference, but requires manual intervention in the form of a button press to reduce tension via the tensioning wheel 110. This assures that the tension on a secured load is not inadvertently reduced, which may allow the load to shift.

Once understood from the details provided herein, the elements of the hook assembly 104 may be formed utilizing conventional manufacturing techniques or, in the case of fasteners, springs, and the like, sourced commercially. For strength, most of the elements of the apparatus 100 preferably comprise a metal such as, but not limited, to steel. Metal machining is described in W. A. Knight et al., *Fundamentals of Metal Machining and Machine Tools, Third Edition*, CRC Press, 2005, which is hereby incorporated by reference herein.

The hook assembly 104 lends itself to several modifications. These numerous alternative embodiments will be apparent to one skilled in the art given the teachings herein.

Figure 8A:
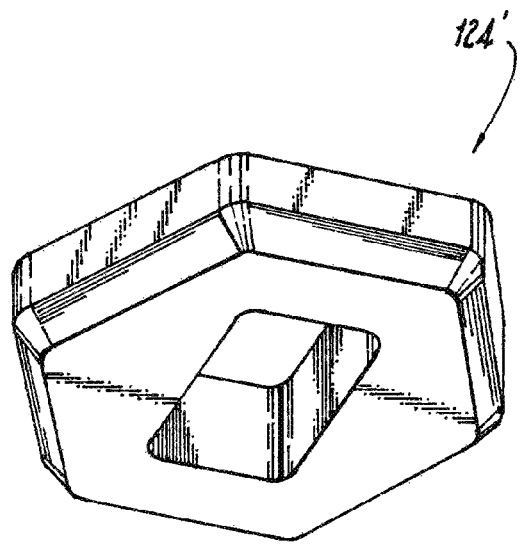
FIG. 8*a* shows a bottom perspective view of a hexagonal locking plate for use in the FIG. 3 hook assembly.
Figure 8B:
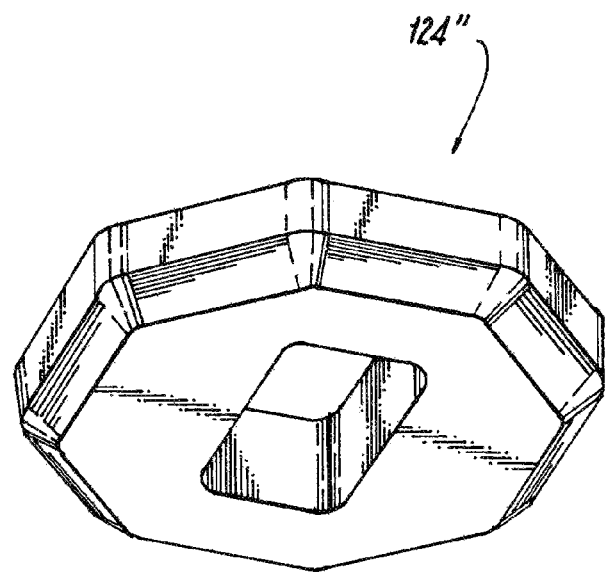
FIG. 8*b* shows a bottom perspective view of an octagonal locking plate for use in the FIG. 3 hook assembly.

For example, as detailed above, the illustrative apparatus 100 utilizes a geometric relationship between the cavity 142 of the locking body 120 and the locking plate 124 that provides four different locked orientations of the hook 106 relative to the frame 102 with 90-degree intervals therebetween. Nevertheless, modified geometries allow additional locked orientations to be designed into an apparatus, as desired. Use of a hexagonal locking plate in combination with a rectangular cavity (like the cavity 142), for example, may allow an alternative embodiment of the invention to take on six locked hook orientations with 60-degree intervals. A bottom perspective view of a hexagonal locking plate 124' for use in the hook assembly 104 is shown in FIG. 8a. Similarly, an octagonal locking plate may allow another alternative embodiment of the invention to take on eight locked geometries with 45-degree intervals. A bottom perspective view of an octagonal locking plate 124" for use in the hook assembly 104 is shown in FIG. 8b. Thus progressively more locked orientations may become available as more outside edges are added to the locking plate. At the same time, other modified geometries may allow fewer than four locked orientations. For example, a rectangular locking plate in combination with a rectangular cavity may provide only two locked hook orientations with 180-degree intervals. Use of a triangular locking plate in combination with a triangular cavity (instead of rectangular) may provide three locked orientations with 120-degree intervals. Accordingly, there are a multiplicity of related geometries that may be used for a locking plate and a locking body, and these alternative embodiments would also come within the scope of the invention.

Moreover, while the apparatus 100 is described as having a hook 106 at one end, alternative forms of attachment elements may be utilized. Alternative embodiments may utilize, for example, attachment elements such as, but not limited to, rings or clevises.

Even further, while the above-described apparatus 100 utilizes particular fasteners such as the roll pins 158 and the bolts 164, it should be reinforced that these particular fasteners are merely by way of illustration, and that other means of fixation may be used in their place. In one or more alternative embodiments falling within the scope of the invention, for example, screws, an adhesive, or joining may be utilized to fixate one or both of the locking body 120 and the biasing element 126 to the frame 102.

Finally, while the biasing element 126 in the illustrative apparatus 100 is in the form of a leaf spring, alternative biasing elements may be utilized. In one or more alternative embodiments, the leaf spring may, for example, be replaced by two double-coil springs that are fixed to the frame 102 by bolts 164 and function to press upward on the locking plate 124. Once the substitution is made, overall functionality will remain similar to what was detailed before.

II. Chain Capture Assembly

Figure 9:
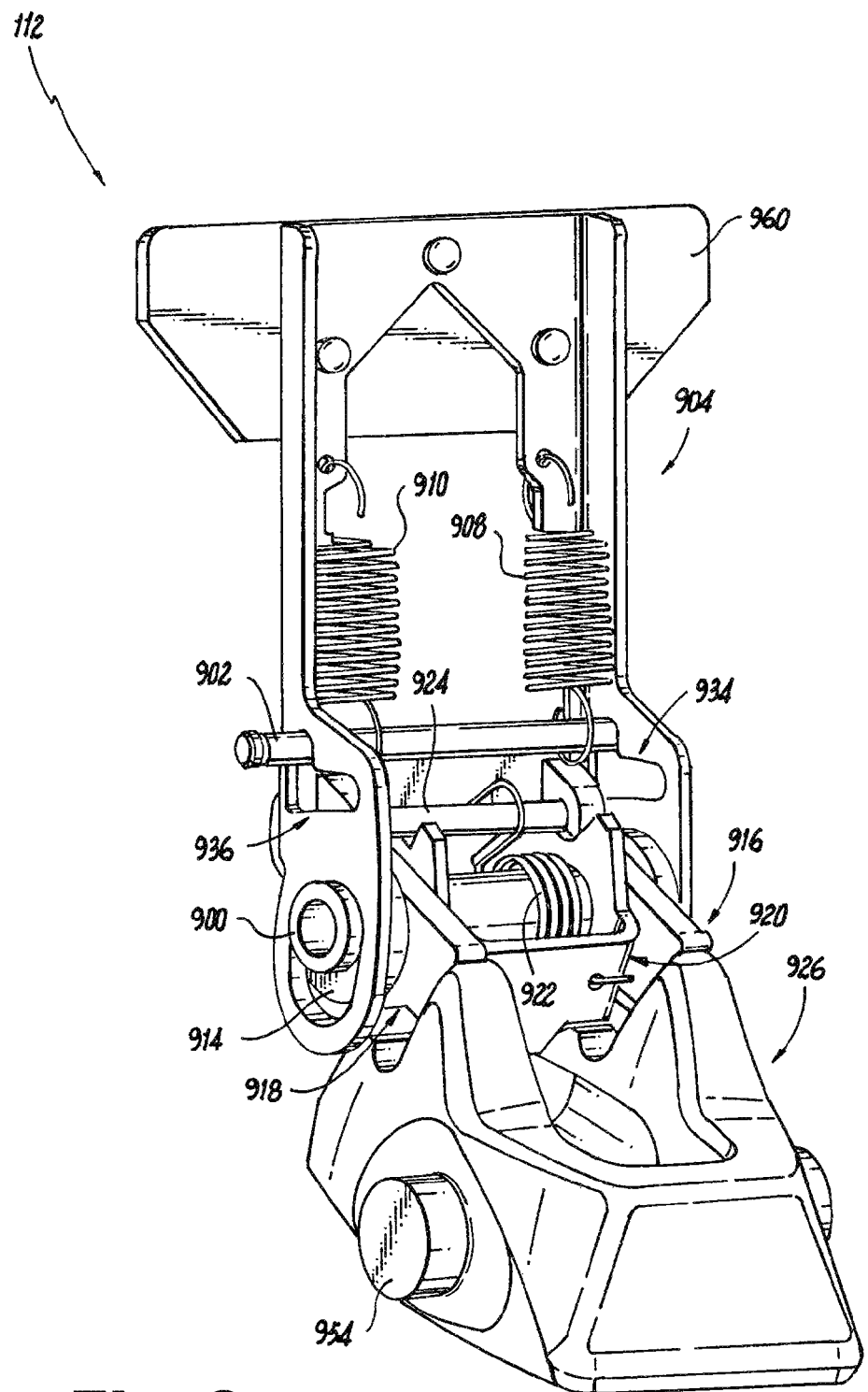
FIG. 9 shows a rear perspective view of the chain capture assembly in the apparatus 100, in accordance with an illustrative embodiment of the invention.
Figure 10:
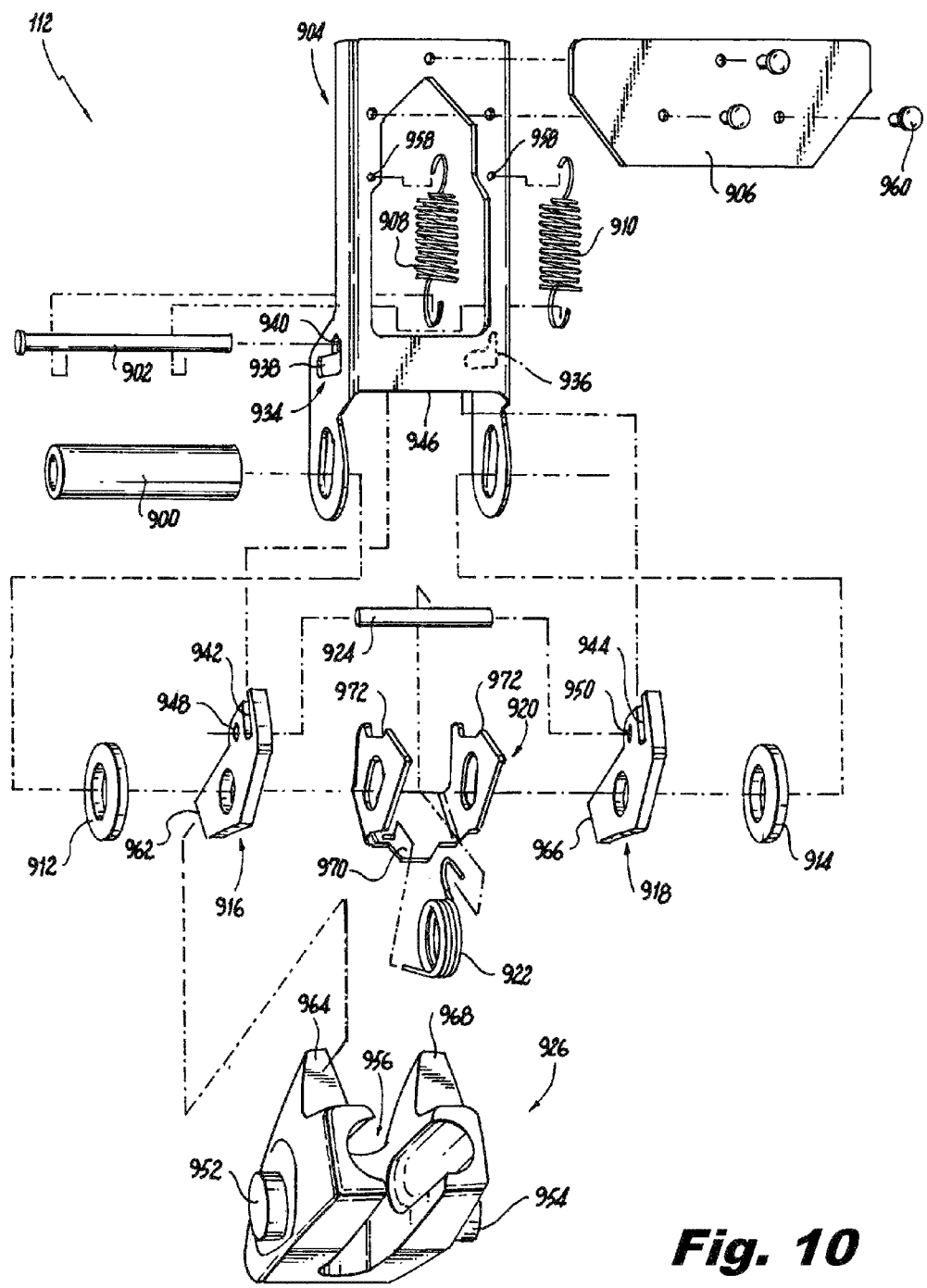
FIG. 10 shows a front exploded perspective view of elements in the FIG. 9 chain capture assembly.

FIG. 9 shows a rear perspective view of the chain capture assembly 112 in the apparatus 100, in accordance with an illustrative embodiment of the invention. FIG. 10, moreover, shows a front exploded perspective view of the elements in FIG. 9. The chain capture assembly 112 comprises: a primary elongate member 900, a secondary elongate member 902, the release handle 904, a release handle label plate 906, a first locking spring 908, a second locking spring 910, a first spacer 912, a second spacer 914, a first rotatable member 916, a second rotatable member 918, a chain keeper member 920, a coil spring 922, a third elongate member 924, and a chain capture block 926.

In the present illustrative embodiment, the primary elongate member 900 describes a cylinder, which is fixed to the frame 102 by a bolt 928 that is terminated by a nut 930 (FIG. 1). In spanning between the pair of parallel sidewalls 103 of the frame 102, the primary elongate member 900 passes through: the release handle 904, the first spacer 912, the first rotatable member 916, the chain keeper member 920, the coil spring 922, the second rotatable member 918, and the second spacer 914. In so doing, the primary elongate member 900 pivotally supports the release handle 904, the first and second rotatable members 916, 918, and the chain keeper member 920. At the same time, the secondary elongate member 902 also spans between the pair of parallel sidewalls 103 of the frame 102. In the present illustrative embodiment, the secondary elongate member 902 describes a pin that is held in place by cotter pins 932 (FIGS. 1 and 2). The secondary elongate member 902 rides in a first shaped guide slot 934 and a second shaped guide slot 936 in the release handle 904. The first and second shaped guide slots 934, 936 are each characterized by a respective arc 938 with an angled projection 940 at one end.

The first and second rotatable members 916, 918 are disposed in spaced relation to one another. The first rotatable member 916 defines a first slot 942 that engages a lower edge 946 of the release handle 904, while the second rotatable member 918 defines a second slot 944 that engages the same lower edge 946. Configured in this manner, the first and second rotatable members 916, 918 are pivotally coupled to the release handle 904 so that the first and second rotatable members 916, 918 pivot in unison with the release handle 904.

The third elongate member 924 is supported between the first and second rotatable members 916, 918 via respective holes 948, 950 in the first and second rotatable members 916, 918. Positioned in this manner, the third elongate member 924 describes an arc in response to the pivoting of the first and second rotatable members 916, 918. The coil spring 922 spans between the chain keeper member 920 and the third elongate member 924. This coupling urges the chain keeper member 920 to pivot in unison with the first and second rotatable members 916, 918.

The chain capture block 926 is pivotally mounted to the frame 102 via two cylindrical bosses 952, 954 that engage matching holes in the pair of parallel sidewalls 103 of the frame 102. In the present non-limiting embodiment, the chain capture block 926 defines a cavity 956 shaped so as to accept two interlocked links of the chain 114. The two links are in substantially normal relation with one another.

Finally, the first and second locking springs 908, 910 span between capture holes 958 in the release handle 904 and the secondary elongate member 902. The first and second locking springs 908, 910 place a downward bias on the release handle 904. This downward bias urges the release handle 904 in the direction of the chain capture block 926. The release handle label plate 906 is riveted to the release handle 904 via rivets 960. The release handle label plate 906 may contain written information such as manufacturer name, part number, date of manufacture, abbreviated instructions for use, any limitations or warnings, and the like.

Figure 11:
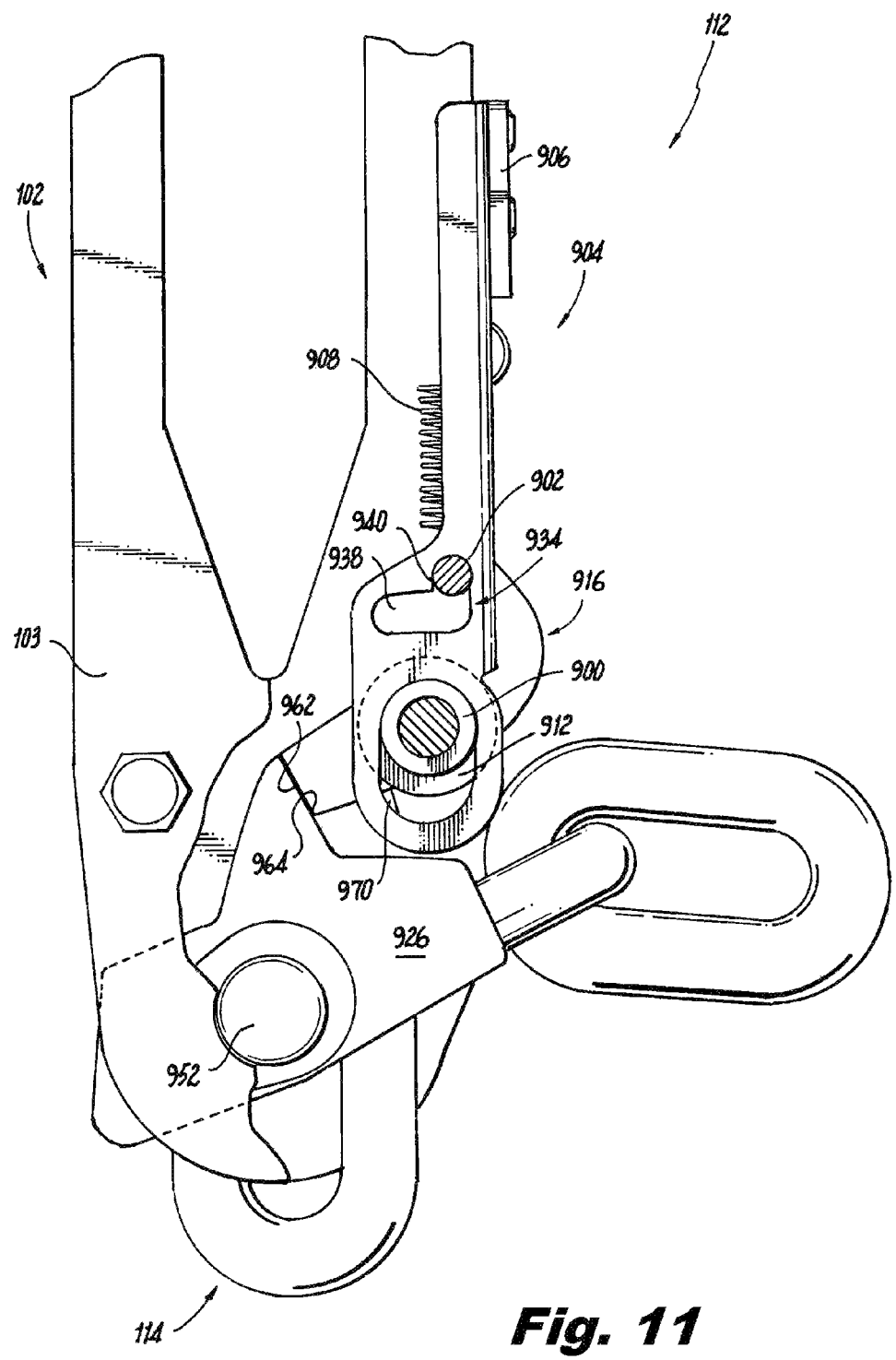
FIGS. 11-13 show partially broken side elevational views of the FIG. 9 chain capture assembly and chain with the chain capture assembly in the locked, unlocked, and open configurations, respectively.
Figure 12:
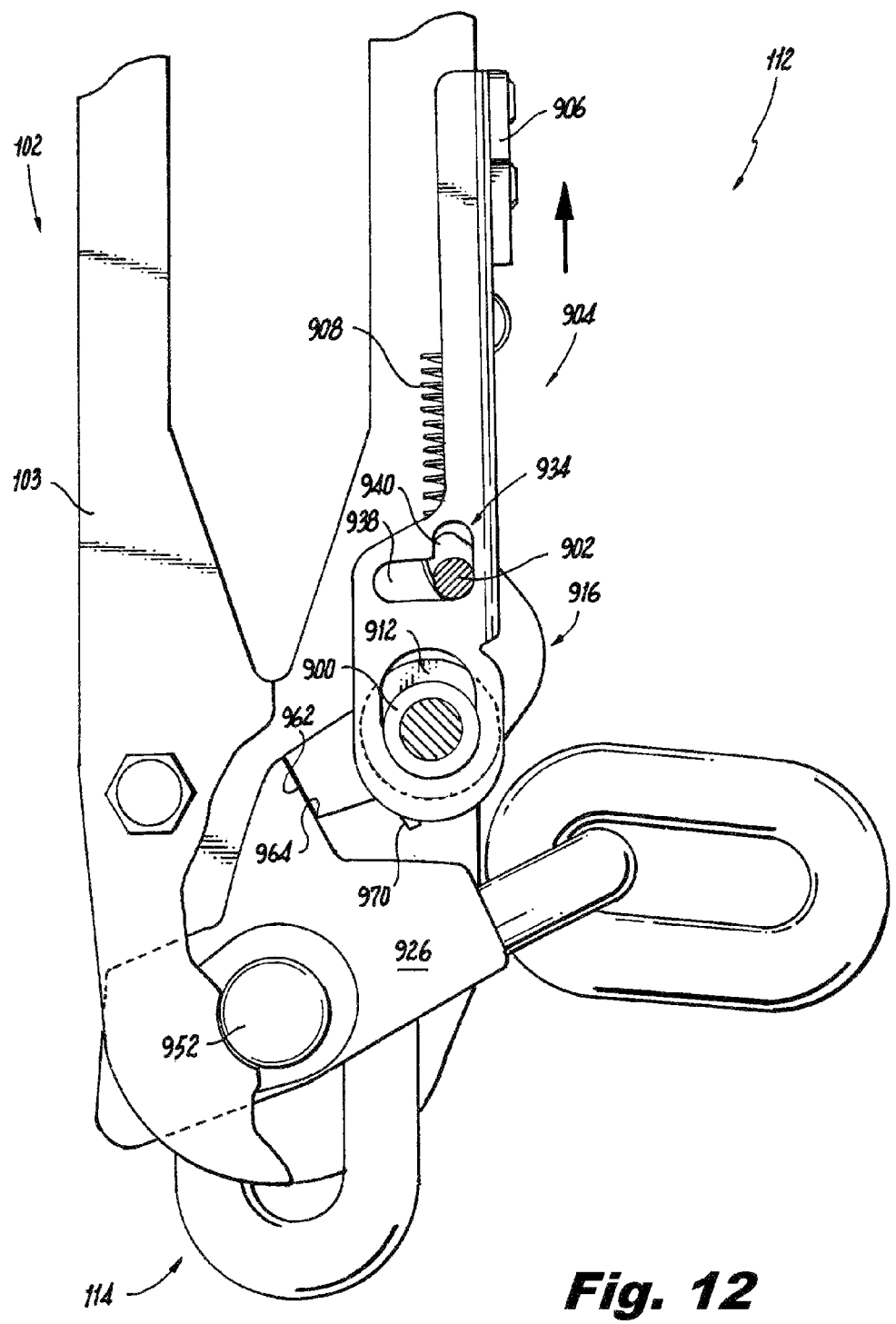
Figure 13:
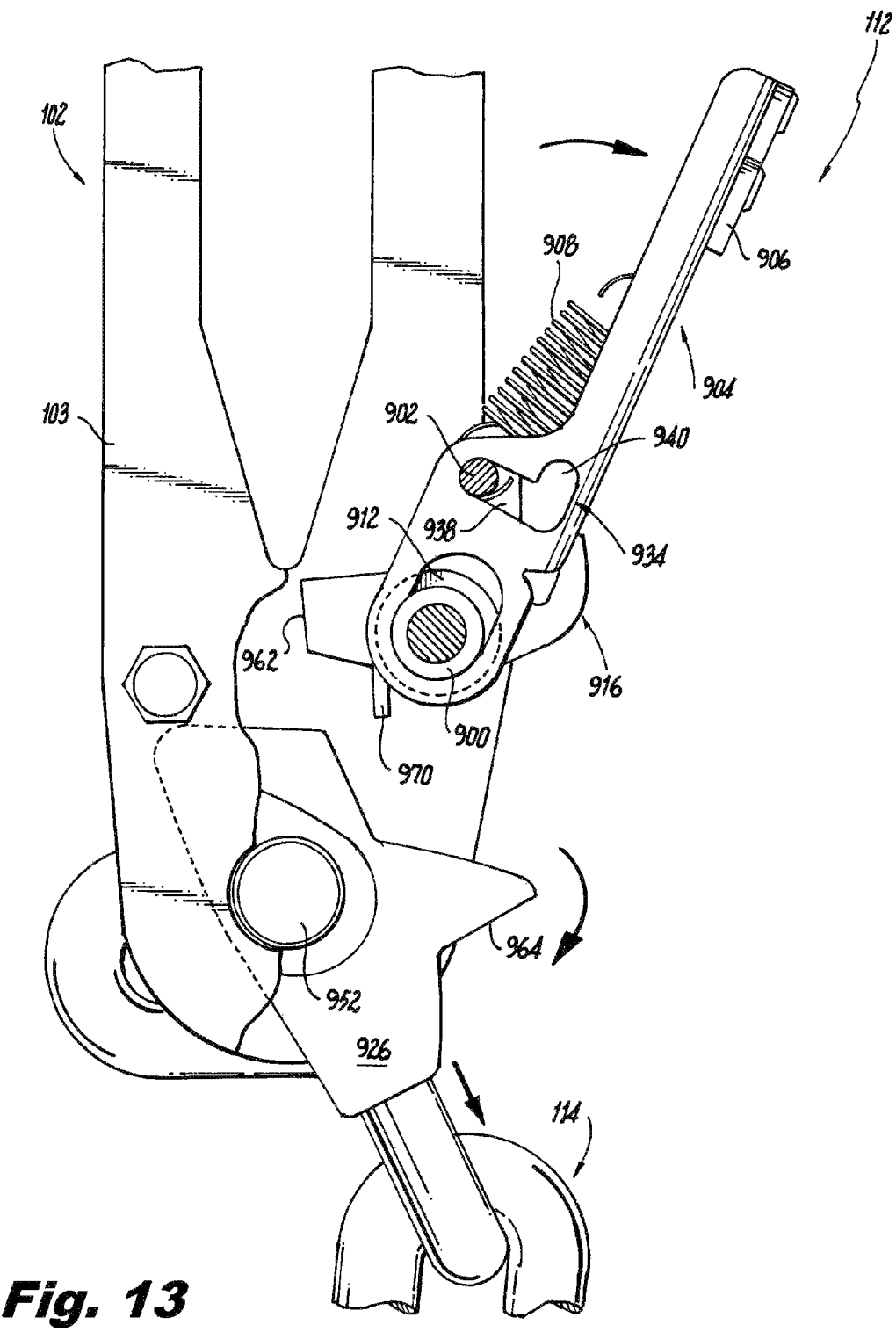

In use, the first and second shaped guide slots 934, 936 in the release handle 904 cooperate with the secondary elongate member 902 to restrict the motion of the release handle 904 between three configurations: a locked configuration, an unlocked configuration, and an open configuration. These configurations are shown in FIGS. 11-13. More particularly, FIGS. 11-13 show a sequence of partially broken, side elevational views of the chain capture assembly 112 and the chain 114 while the chain release handle 904 is in the locked configuration, the unlocked configuration, and the open configuration, respectively.

In the locked configuration (FIG. 11), the secondary elongate member 902 occupies the respective angled projections 940 of the first and second shaped guide slots 934, 936, and the release handle 904 sits flush (i.e., vertically) in the frame 102. In this configuration, the release handle 904 may not be pivoted relative to the frame 102. At the same time, a first abutment surface 962 of the first rotatable member 916 abuts a first landing surface 964 of the chain capture block 926, while a second abutment surface 966 of the second rotatable member 918 abuts a second landing surface 968 of the chain capture block 926. The first and second rotatable members 916, 918 thereby hold the chain capture block 926 in a fixed orientation in the frame 102 with the mouth of the cavity 956 angled somewhat upward. This orientation of the chain capture block 926 is hereinafter called the "chain capture orientation."

A user may insert the chain 114 into the chain capture block 926 while the release handle 904 is in the locked configuration and the chain capture block 926 is in the chain capture orientation simply by inserting two links of the chain 114 into the cavity 956 of the chain capture block 926 while the chain 114 is not under tension. In making this insertion, the vertically oriented link of the two chain links will press against a projection 970 on the chain keeper member 920, but the chain keeper member 920 will pivot out of the way so that the vertical link can pass unimpeded. After the vertical chain link passes, the chain keeper member 920 will snap back into position in response to the bias of the coil spring 922.

In contrast, once the chain links of the chain 114 are inserted into the cavity 956 of the chain capture block 926 (FIG. 11), the projection 970 of the chain keeper member 920 will interfere with the removal of those links from the chain capture block 926. More particularly, tabs 972 on the chain keeper member 920 will interact with the third elongate member 924 to stop the chain keeper member 920 from pivoting in the required direction for the chain 114 to be removed. The chain keeper member 920 therefore allows easy insertion of the chain 114 into the chain capture block 926, but interferes with the removal of the chain 114 once so inserted. The chances of the chain 114 inadvertently falling out of the chain capture block 926 are thereby mitigated.

Once the chain 114 is inserted into the chain capture block 926 and under tension, the chain capture block 926 in cooperation with the remainder of the chain capture assembly 112 will securely capture the chain 114. This configuration will be maintained until a user chooses to intentionally release the chain 114. To release the chain 114 requires that two distinct forces be applied to the release handle 904.

The first step in releasing the chain 114 is shown in FIG. 12, which shows the release handle 904 after it has been translated from the locked configuration into the unlocked configuration. To achieve this unlocked configuration, the release handle 904 is translated relative to the frame 102 upward away from the chain capture block 926 while the orientation of the release handle 904 relative to the frame 102 remains largely fixed (i.e., the release handle 904 remains flush to the frame 102). This upward motion occurs against the bias of the first and second locking springs 908, 910, thereby requiring an intentional actuation by the user. That is, the first and second locking springs 908, 910 urge the release handle 904 from the unlocked configuration back into the locked configuration when the release handle 904 is translated upward into the unlocked configuration. Once in the unlocked state, the secondary elongate member 902 has moved from the respective angled projections 940 of the first and second shaped guide slots 934, 936 into their respective arcs 938. The release handle 904 therefore is no longer restricted from pivoting, as was the case in the locked configuration (FIG. 11). Nevertheless, as long as the release handle 904 stays flush to the frame 102, the chain capture block 926 remains restricted in its ability to pivot in the frame 102, and the chain 114 remains secured.

Subsequently, in a second separate, positive motion, the release handle 904 may be pivoted relative to the frame 102 to achieve the open configuration in FIG. 13. In the open configuration, the first and second abutment surfaces 962, 966 of the first and second rotatable members 916, 918 disengage from the first and second landing surfaces 964, 968 of the chain capture block 926, allowing the chain capture block 926 to now freely pivot within the frame 102. As shown in FIG. 13, the chain capture block 926 pivots in the frame 102 to a "chain release orientation." The chain 114 is thereby allowed to fall away from the chain capture assembly 112 and, more generally, the apparatus 100.

Subsequently, to place the apparatus 100 in condition to again receive the chain 114, the chain capture block 926 is returned to the chain capture orientation and the release handle 904 is pivoted back into its unlocked configuration flush to the frame 102 (FIG. 12). Thereafter, the release handle 904 is allowed to translate downward into the locked configuration (FIG. 11).

To summarize, the chain capture block 926 is operative to achieve a chain capture orientation and a chain release orientation relative to the frame 102. The first and second shaped guide slots 934, 936 in the release handle 904 cooperate with the secondary elongate member 902 to allow the release handle 904 to be translated relative to the frame 102 between the locked configuration and the unlocked configuration. At the same time, the first and second shaped guide slots 934, 936 further cooperate with the secondary elongate member 902 to allow the release handle 904 to be pivoted relative to frame 102 between the unlocked configuration and the open configuration. With the release handle 904 in the locked and unlocked configurations, the first and second rotatable members 916, 918 interfere with the pivoting of the chain capture block 926 from the chain capture orientation to the chain release orientation. With the release handle 904 in the open configuration, the chain capture block 926 is free to pivot between the chain capture orientation and the chain release orientation.

Configured in the manner set forth above, the chain capture assembly 112 requires that two distinct forces be applied to the release handle 904 in order to release the chain 114. Prior art assemblies, in contrast, have typically required only a single motion of a release handle to release a chain, making these prior art assemblies more prone to inadvertent releases. Advantageously, the two separate forces required to release the chain capture assembly 112 (i.e., first the upward translation of the release handle 904, and then the pivoting of the release handle 904 away from the frame 102) are in two almost opposite directions. Inadvertent releases are therefore extremely unlikely when utilizing the chain capture assembly 112, and more generally, embodiments in accordance with aspects of the invention.

Once understood from the details provided herein, the elements of the chain capture assembly 112 may be formed utilizing conventional manufacturing techniques or, in the case of fasteners, springs, and the like, sourced commercially.

For strength, most of the elements of the apparatus 100 preferably comprise a metal such as, but not limited, to steel. Metal machining is described in W. A. Knight et al., *Fundamentals of Metal Machining and Machine Tools, Third Edition* (cited earlier).

Like the hook assembly 104, the chain capture assembly 112 lends itself to several modifications. As just one example, the particular fasteners and types of springs utilized in the embodiment set forth above may be replaced by equally suitable fasteners and biasing elements, and the results would still come within the scope of the invention. As another example, embodiments in accordance with aspects of the invention may utilize only a single rotatable member (instead of a pair of rotatable members) to obtain the desired functionality. These numerous alternative embodiments will be apparent to one skilled in the art given the teachings herein.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. §112(f). In particular, the use of "step of" in the claims herein is not intended to invoke the provisions of AIA 35 U.S.C. §112(f).

What is claimed is:

1. An apparatus comprising:
    a frame;
    a locking body, the locking body fixed in the frame, and defining a cavity and an aperture therein, the aperture being in communication with the cavity;
    a threaded receiver, the threaded receiver passing through the aperture, at least partially occupying the cavity, and free to rotate;
    a locking plate, the locking plate defining a mating slot and having a shape that prevents the locking plate from rotating within the cavity when the locking plate is inserted into the cavity;
    a biasing element, the biasing element in contact with the locking plate;
    an attachment element; and
    a threaded shaft, the threaded shaft extending in a longitudinal direction from the attachment element through the threaded receiver and the mating slot, and shaped so as to cooperate with the mating slot to prevent the threaded shaft from rotating independently of the locking plate while still being translatable in the longitudinal direction therethrough;
    wherein the apparatus is operative to take on a plurality of locked states and an unlocked state, each of the plurality of locked states characterized by the locking plate being pressed into the cavity by the biasing element and thereby prevented from rotating by the locking body, and the unlocked state characterized by the locking plate being outside the cavity and thereby free to rotate;
    wherein the unlocked state can be achieved from a respective one of the plurality of locked states by manually pressing the threaded receiver against the locking plate so as to translate the locking plate out of the cavity counter to the bias of the biasing element.

2. The apparatus of claim 1, wherein the threaded receiver comprises a protruding lip, the protruding lip occupying the cavity and abutting a perimeter of the aperture inside the cavity when the apparatus is in one of the plurality of locked states.

3. The apparatus of claim 2, wherein the protruding lip is in spaced relation to the perimeter of the aperture when the apparatus is in the unlocked state.

4. The apparatus of claim 3, wherein the biasing element presses the locking plate against the threaded receiver.

5. The apparatus of claim 1, wherein the locking plate defines a pair of parallel outside edges.

6. The apparatus of claim 5, wherein the locking body defines a pair of parallel internal sidewalls spaced apart by a distance about equal to a space between the pair of parallel outside edges.

7. The apparatus of claim 1, wherein a portion of the threaded shaft is defined by an externally threaded cylinder with a pair of oppositely facing flat surfaces.

8. The apparatus of claim 7, wherein the mating slot is characterized by a pair of opposed sidewalls spaced apart by a distance about equal to a spacing between the pair of oppositely facing flat surfaces.

9. The apparatus of claim 7, wherein the mating slot is characterized by a pair of opposite sidewalls spaced apart by a distance greater than a maximum diameter of the externally threaded cylinder.

10. The apparatus of claim 1, wherein the biasing element comprises a spring.

11. The apparatus of claim 10, wherein the spring comprises a leaf spring.

12. The apparatus of claim 1, wherein the attachment element comprises a hook.

13. The apparatus of claim 12, wherein the hook comprises a spring-loaded keeper.

14. The apparatus of claim 1, further comprising a tensioning wheel, the tensioning wheel rotatably and translatably coupled to the threaded receiver.

15. The apparatus of claim 1, wherein the apparatus is adapted to be releasably attached to a chain.

16. The apparatus of claim 1, wherein rotating the threaded receiver with the apparatus in the locked state causes the attachment element to move in the longitudinal direction relative to the frame while maintaining a fixed orientation relative to the frame.

17. The apparatus of claim 1, wherein the attachment element is operative to take on four different locked states, each of the four locked states characterized by a different orientation of the attachment element relative to the frame.

18. The apparatus of claim 1, wherein the attachment element is operative to take on more than four different locked states, each of the more than four locked states characterized by a different orientation of the attachment element relative to the frame.

* * * * *